United States Patent
Canel Lopez et al.

(10) Patent No.: US 11,379,905 B2
(45) Date of Patent: Jul. 5, 2022

(54) PROCESSING FULFILLMENT USING STATELESS APIS AND COMPLEX CLASSES

(71) Applicant: salesforce.com, inc., San Francisco, CA (US)

(72) Inventors: Osvaldo Rene Canel Lopez, Weston, FL (US); Michael Starukhin, Parkland, FL (US); Steven deRochemont, Lighthouse Point, FL (US); Vadim Shmah, Deerfield Beach, FL (US)

(73) Assignee: Salesforce, Inc., San Francisco, CA (US)

( * ) Notice: Subject to any disclaimer, the term of this patent is extended or adjusted under 35 U.S.C. 154(b) by 9 days.

(21) Appl. No.: 16/732,552

(22) Filed: Jan. 2, 2020

(65) Prior Publication Data

US 2021/0209669 A1 Jul. 8, 2021

(51) Int. Cl.
*G06Q 30/06* (2012.01)
*G06F 16/10* (2019.01)
*G06Q 10/08* (2012.01)

(52) U.S. Cl.
CPC ......... *G06Q 30/0635* (2013.01); *G06F 16/10* (2019.01); *G06Q 10/087* (2013.01); *G06Q 30/0641* (2013.01)

(58) Field of Classification Search
CPC ...... G06Q 30/0601–6/45; G06Q 30/08; G06Q 30/0633; G06Q 30/0635; G06Q 30/0641; G06Q 10/08; G06Q 10/087; G06Q 16/10; G06F 16/10
USPC .............................................. 705/26.1–27.2
See application file for complete search history.

(56) References Cited

U.S. PATENT DOCUMENTS

| | | | |
|---|---|---|---|
| 8,447,829 B1 * | 5/2013 | Geller | H04L 9/3239 709/217 |
| 9,595,061 B1 * | 3/2017 | Ryan | G06Q 20/202 |
| 9,959,562 B1 * | 5/2018 | Ackerman | G06Q 30/0631 |
| 10,636,079 B2 * | 4/2020 | Shiely | G06Q 30/0639 |
| 10,776,750 B2 * | 9/2020 | Lindbo | G06Q 30/0621 |
| 10,924,482 B1 * | 2/2021 | Roth | H04L 63/0892 |
| 11,263,584 B2 * | 3/2022 | Wicker | H04L 67/1002 |

(Continued)

OTHER PUBLICATIONS

Hauser, Birgitta. "SQL JSON Publishing Functions." IBM Developer, Oct. 9, 2018, developer.ibm.com/technologies/systems/articles/sql-json-publishing-functions/#.*

(Continued)

*Primary Examiner* — Michael Misiaszek
(74) *Attorney, Agent, or Firm* — Holland & Hart LLP

(57) ABSTRACT

Aspects of the disclosure described herein provide for a streamlined system for developing an order fulfillment process. The system may include a stateless web resource application programming interface (API) supported by a server, which may be configured as an endpoint to receive order requests (e.g., via an e-commerce website) and generate an instance of a complex object based on the order request. The instance of the complex object may be generated according to an invocable action configured at the system and may include one or more nested data types corresponding to order parameters indicated by the order request. The instance of the complex object may be processed according to fulfillment rules to generate a response to the order request. The response to the order request may include an identification of an order fulfillment center, a fulfillment order, etc.

17 Claims, 10 Drawing Sheets

(56) References Cited

U.S. PATENT DOCUMENTS

| | | | | |
|---|---|---|---|---|
| 2004/0111302 | A1* | 6/2004 | Falk | G06Q 40/02 |
| | | | | 705/4 |
| 2013/0132854 | A1* | 5/2013 | Raleigh | H04W 4/60 |
| | | | | 715/738 |
| 2018/0232262 | A1* | 8/2018 | Chowdhury | G06F 16/252 |
| 2019/0362309 | A1* | 11/2019 | Ang | G06Q 10/0875 |

OTHER PUBLICATIONS

Ship-from-Store Operations in Omni-Channel Retailing. Bayram, Armağan; Cesaret, Bahriye. IIE Annual Conference. Proceedings: 1181-1186. Institute of Industrial and Systems Engineers (IISE). (2017) Retrieved via ProQuest/Dialog. (Year: 2017).*

* cited by examiner

PROCESSING FULFILLMENT USING STATELESS APIS AND COMPLEX CLASSES

FIELD OF TECHNOLOGY

The present disclosure relates generally to database systems and data processing, and more specifically to processing fulfillment using stateless Application Programming Interfaces (APIs) and complex classes.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support a fulfillment service that may receive and process orders to generate fulfillment orders. In some cases, a data scientist may configure such systems to be applicable to specific organizations. In some organizations, order fulfillment may be associated with complex data processing.

DETAILED DESCRIPTION

A fulfillment process may analyze orders to determine how and where (e.g., physical location for physical goods and/or locations for software services using other factors) orders may be filled. Each customer may have different needs for determining locations and other factors for fulfilling orders. In conventional fulfillment processes, a data scientist may be required to write code to analyze orders to perform fulfillment.

Aspects of the disclosure described herein provide for a streamlined system for developing an order fulfillment process. The system may include a stateless web resource application programming interface (API), which may be configured as an endpoint to receive order requests (e.g., via an e-commerce website) and generate an instance of a complex object based on the order request. The instance of the complex object may be generated according to an invocable action configured at the system and may include one or more nested data types corresponding to order parameters indicated by the order request. The instance of the complex object may be processed according to fulfillment rules to generate a response to the order request. The response to the order request may include an identification of an order fulfillment center, a fulfillment order, etc. Accordingly, the system may utilize preconfigured invocable actions to efficiently process received orders and generate responses.

In some cases, the complex object defines one or more variables that are processable by the fulfillment rules, and the instance of the complex object may be stored in a file storage system such that it may be efficiently processed to generate the response. In some instances, the response may identify a fulfillment center location or may include a fulfillment order that may be transmitted to a fulfillment center. The fulfillment rules may be defined at a user interface that is configured to define a series of components representing logical processes. For example, order request intake and processing may be defined at the user interface, and the instance of the complex object may be processed in accordance with the intake and processing definition at the user interface.

Aspects of the disclosure are initially described in the context of an environment supporting an on-demand database service. Aspects of the disclosure are further described with respect to a general order processing system diagram, and a complex object implementation diagram. Aspects of the disclosure are further illustrated by and described with reference to apparatus diagrams, system diagrams, and flowcharts that relate to processing fulfillment using stateless APIs and complex classes.

Figure 1:
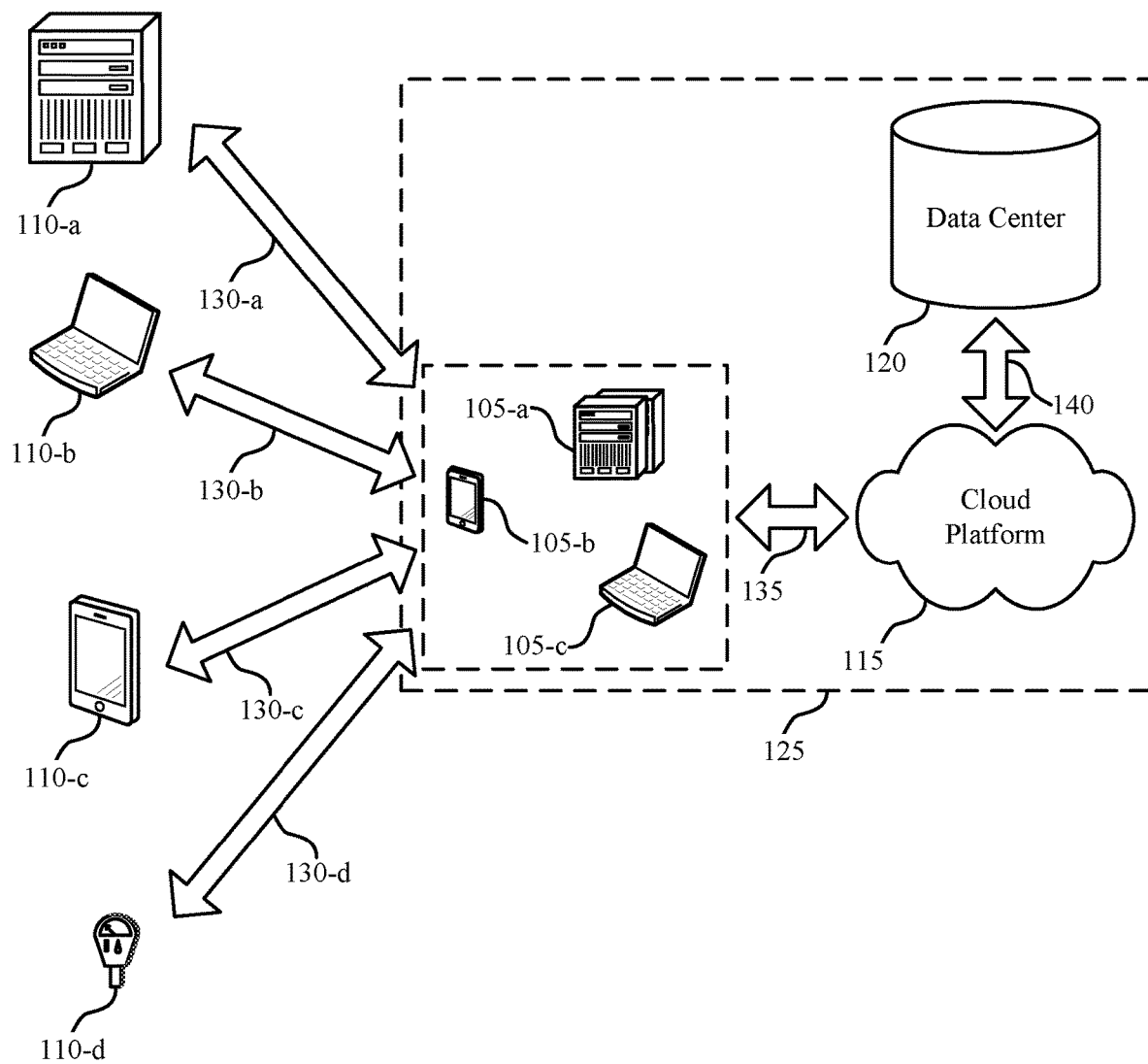
FIG. 1 illustrates an example of a system for data processing that supports processing fulfillment using stateless APIs and complex classes in accordance with aspects of the present disclosure.

FIG. 1 illustrates an example of a system 100 for cloud computing that supports processing fulfillment using stateless APIs and complex classes in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to some applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support an order fulfillment system. For example, the order fulfillment system may receive orders by cloud contacts 110 (e.g., customers) of cloud clients 105 and generate responses to the order request to fulfill the orders so that products/services may be delivered to the cloud contacts 110 by a fulfillment center. The fulfillment system may support defining complex objects that may represent orders. The complex object may include variables representing various aspects of an order (e.g., product/service identification (ID), order quantity, order characteristics, etc.), and these complex objects may be efficiently processed by the system such as to generate a response or fulfillment order.

In conventional order fulfillment systems, a data scientist or software developer may configure a system specific to a firm or organization. This may require in depth knowledge of the organizations' business structure, products, customer base, etc. Further, the system may not be extensible to other fulfillment processes, such that a new system build or overhaul may be required if products or services change. Further, some systems may be configured to process only simple data types, which may limit the types of rules that may be applied to order requests.

Implementations described herein are supported by cloud platform 115 to provide a fulfillment system that may be easily customizable and may be able to support complex order types and fulfillment rules. The system includes a stateless web resource API that may receive order requests (e.g., via an e-commerce website), and the request may specify one or more order parameters and indicate an invocable action (e.g., configured at a server supporting the API). For example, an invocable action may be configured to convert the order request into an instance of a complex object that may be efficiently digestible or processable by an order fulfillment process (e.g., one or more order fulfillment rules) such as to generate a response or fulfillment order. The instance of the complex object may be stored as a file in a file system to further support efficient processing.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example utilization of the system, a cloud client 105 may configure a fulfillment system using the techniques described herein. A user, administrator, etc. of the cloud client 105 may use the system to configure a complex object that may represent received orders. Configuration of a complex object may include defining various variables of the complex object. The user may also define a function for converting a received order into the complex object (e.g., a parsing function), that may be linked to an API that receives order requests. The user may define business logic for fulfilling an order request, and the business logic may process the complex object using order fulfillment rules to identify a fulfillment center, generate a fulfillment order etc. For example, a rule may be configured to identify the closest fulfillment center to a customer. Once the system is activated, the system may be able to process order request received at a website (or application, application server, etc.) and fulfill the orders in accordance with the response to the order request generate by the system described herein.

Figure 2:
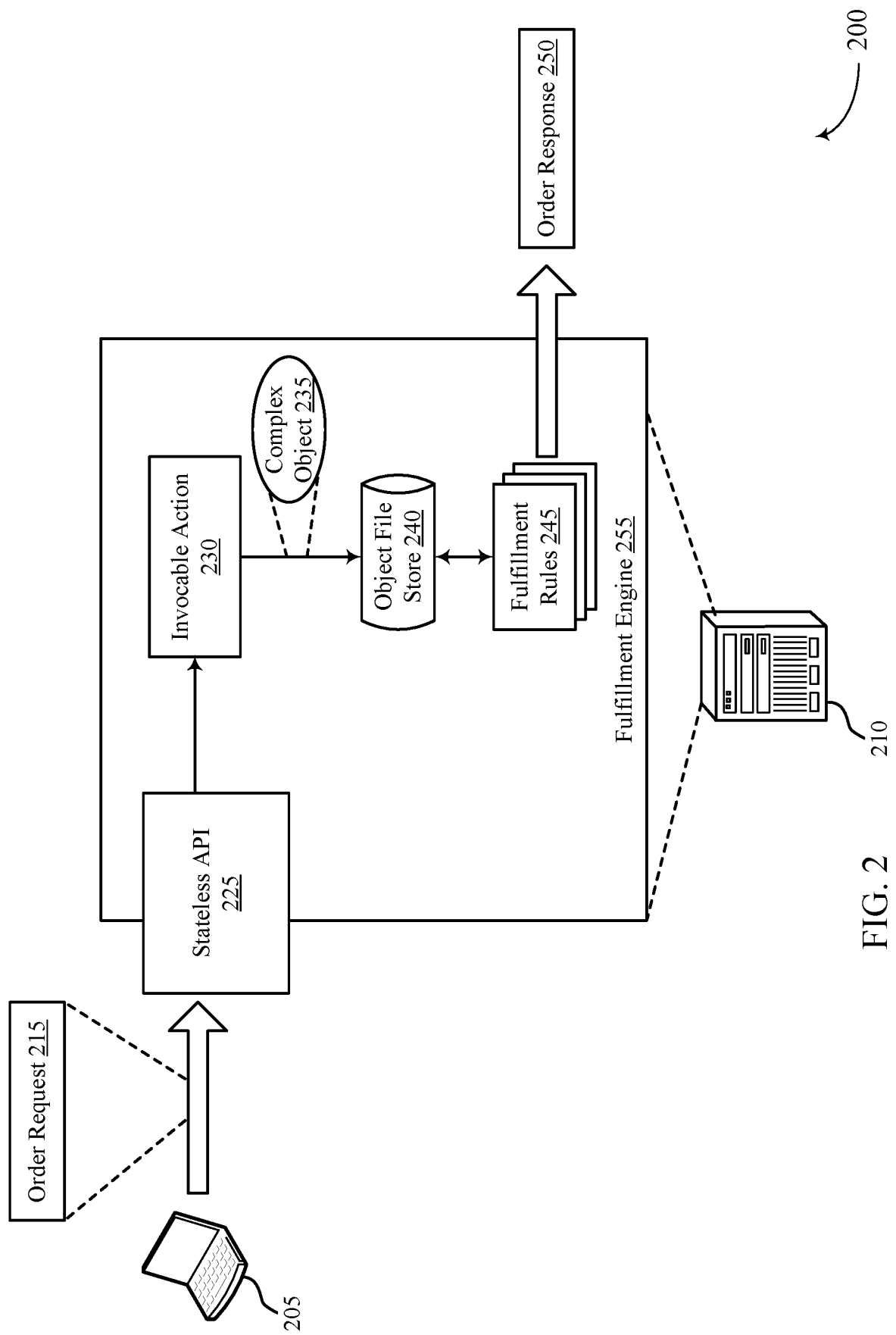
FIG. 2 illustrates an example of an order processing system that supports processing fulfillment using stateless APIs and complex classes in accordance with aspects of the present disclosure.

FIG. 2 illustrates an example of an order processing system 200 that supports processing fulfillment using stateless APIs and complex classes in accordance with aspects of the present disclosure. The order processing system 200 includes a client device 205 and a server 210. The server 210 may be an example of an application server, an operational or analytical data store, etc., and may include aspects of the data center 120 of FIG. 1. The client device 205 may be an example of a user device associated with a cloud contact 110 or cloud client 105 of FIG. 1. In some cases, the client device 205 may represent another server that sends order requests to the server 210. For example, the client device 205 may correspond to a server supporting an e-commerce website associated with a cloud client 105.

Figure 5:
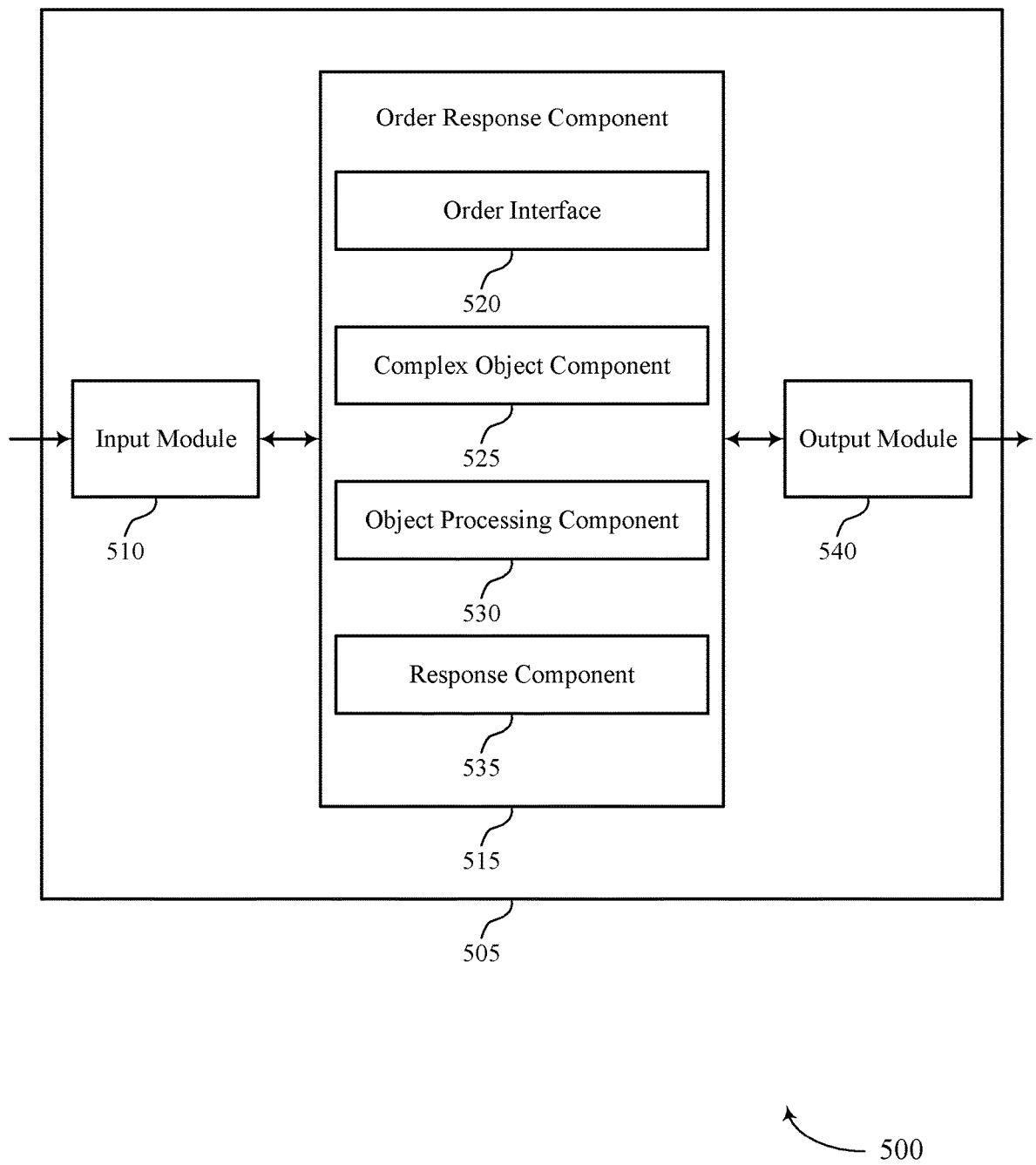
FIG. 5 shows a block diagram of an apparatus that supports processing fulfillment using stateless APIs and complex classes in accordance with aspects of the present disclosure.
Figure 6:
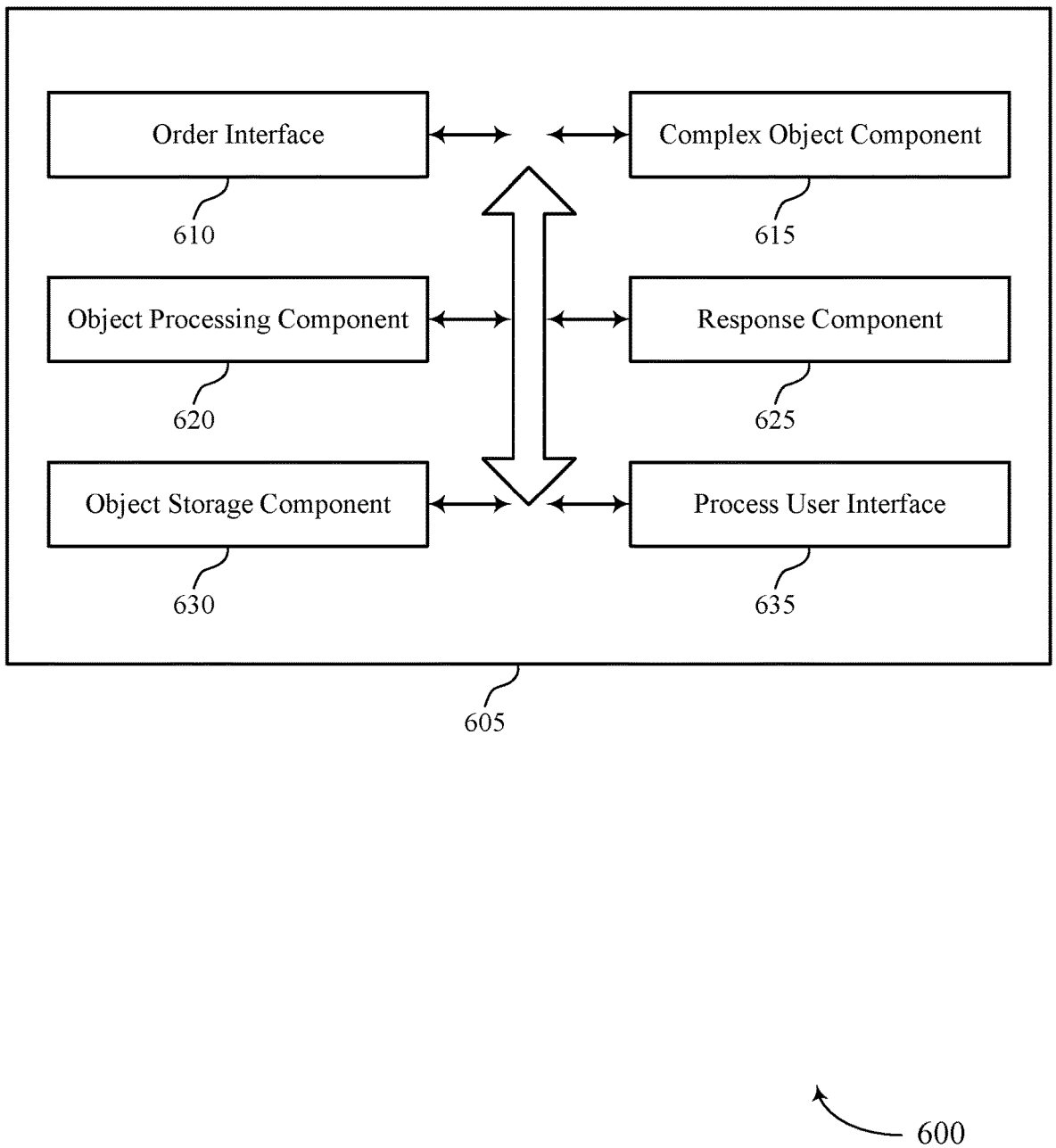
FIG. 6 shows a block diagram of an order response component that supports processing fulfillment using stateless APIs and complex classes in accordance with aspects of the present disclosure.

The server 210 supports a fulfillment engine 255, which may be an example of aspects of device 505 described with respect to FIG. 5 or an order response component 605 of FIG. 6. The fulfillment engine 255 is associated with a stateless API 225 (e.g., a stateless web resource API), which may receive order requests 215 from the client device 205. The order request may specify one or more order parameters such as a product or service identifier, a quantity, optional features, a customer identifier, payment method, etc. The order request may also indicate an invocable action 230. For example, the client side application executing on the client device 205 may be associated with an organization (e.g., an e-commerce website or application for the organization). The client device 205 or application executing on the client device 205 may be configured to identify an invocable action in the order request 215 depending on the order type, product, etc.

The invocable action 230 may be an example of a method that may be called with an API (e.g., the stateless API 225). The method may correspond to a method of a class or object. As described herein, the method may correspond to a complex object, and the invocable action 230 may be utilized to generate an instance of complex object 235 that represents the order request 215. The instance of the complex object 235 may include nested data types corresponding to the one or more order parameters. For example, the instance of the complex object 235 may include other objects with various variables. In one example, a complex object may define an order request 215, and the complex object may include various variables corresponding to the product and an object that corresponds to the customer. The object that corresponds to the customer may include variables such as a customer identifier, address, etc. As such, the instance of the complex object 235 may include nested data (e.g., product data and a customer object). In some cases, the complex object 235 may be referred to as a contract.

The invocable action 230 may include a parsing or other data ingestion method that ingests data (e.g., parameters) from the order request 215 and stores the data in the fields of the instance of the complex object 235. The instance of the complex object 235 may be stored in an object file store 240 configured to store various complex objects as files such that the instance of the complex objects may be efficiently retrieved and processed for order fulfillment.

One or more fulfillment rules 245 may be used to process the complex object 235 stored in the object file store 240 to generate an order response 250. The fulfillment rules 245 may be examples of invocable actions that may process the complex object 235 and output complex objects. The fulfillment rules may be defined by a visual representation including a plurality of components added to a display template. For example, a user may configure the fulfillment allocation process using a user interface, and the user may add various components to the user interface to define the fulfillment allocation process. Some components may represent the fulfillment rules 245. The fulfillment rules 245 may determine aspects of order fulfillment such as an identification of a fulfillment center to fulfill the order request 215, etc. For example, the fulfillment rules 245 may identify a fulfillment center that is in geographical proximity to the customer (e.g., based on the customers location included in the order request 215). The fulfillment rules 245 may also analyze a quantity in an order, compare the quantity to quantifies available at fulfillment centers, and identify the closest fulfillment center that is able to deliver the requested quantity. Other considerations may be local time for the customer making the order request 215 and the working time of the fulfillment center (e.g., when the order is a service). Other types of fulfillment rules 245 are contemplated within the scope of the disclosure.

The fulfillment engine 255 may generate the order response 250 based on the processing of the complex object 235 by the fulfillment rules 245. The order response 250 may include an identification of a fulfillment center, a fulfillment order, etc. In some cases, the response 250 (e.g., a fulfillment order) may be transmitted to one or more fulfillment centers for order fulfillment.

Figure 3:
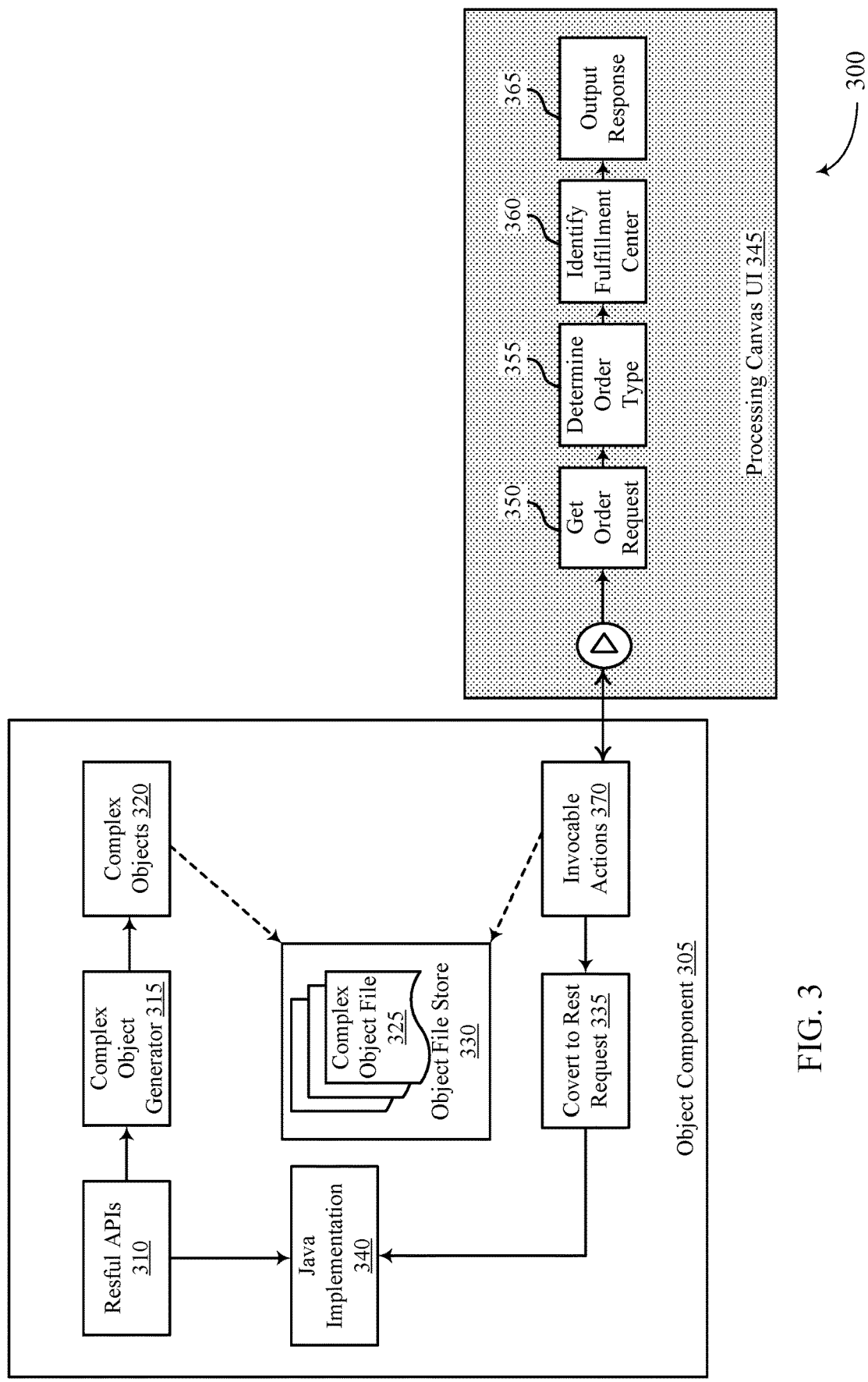
FIG. 3 illustrates an example of a complex object implementation diagram that supports processing fulfillment using stateless APIs and complex classes in accordance with aspects of the present disclosure.

FIG. 3 illustrates an example of a complex object implementation diagram 300 that supports processing fulfillment using stateless APIs and complex classes in accordance with aspects of the present disclosure. The complex object implementation diagram 300 includes an object component 305, which supports the generation and processing of complex objects for fulfillment allocation. Actions that define or utilize complex objects may be exposed to a restful API 310 (e.g., a web resources application programming interface) as well as through invocable actions that may be used in complex business logic.

As described herein, restful APIs 310 may be configured to generate complex objects 320 (e.g., using a complex object generator 315). The complex object generator 315 may be an example of a method defined in an invocable action. Thus, a request received at the restful API 310 may indicate an invocable action or complex object type, and the corresponding method may be utilized to convert the request (e.g., an order request 215 of FIG. 2) to an instance of complex object 320 for fulfillment processing. The instances of the complex objects 320 generated in accordance with a request received at restful APIs 310 may be stored as a complex object file 325 in an object file store 330 for efficient processing. The complex objects may be defined by a user, and leveraged by the restful APIs 310 to generate the instances of the complex objects 320, which are stored as the complex object files 325 in the object file store 330. The restful APIs 310 may leverage serialized versions of definitions of complex objects 320 to generate the instance of the complex objects 320. Thus, at pre-compile time a serializer or deserializer may be used to generate complex objects as the files. At run-time, the restful API along with the invocable actions may be able to retrieve a complex object file, fill the parameters of the complex object with parameters values of the order, and process the complex object file to determine order fulfillment.

The invocable actions 370 may be configured in accordance with a user interface (UI) 345 that may be used to define the complex business logic for fulfillment processing. The invocable actions 370 may be configured to process the complex objects as files such as to perform fulfillment processing. One example invocable action may define a fulfillment rule that identifies the closest fulfillment center to a customer associated with the order request. As such, the rule may use various aspects of the complex object (e.g., a customer object with a customer address) in relation to location of fulfillment centers to identify the closest fulfillment center.

As illustrated in the UI 345, a user may define a business logic process by dragging and dropping components (e.g., an action 350) into a canvas and configuring the components for a specific purpose (e.g., by changing various variables and characteristics). An action 350 may receive the order request and generate a complex object for the order request. In some cases, the complex object is a complex object corresponding to an object-oriented programming language (e.g., an Apex complex object type), although other languages are contemplated. The action 350 may correspond to an invocable action that is identified in the order request by the client device. The component 355 may determine an order type by identifying the product, service etc. Depending on the order type, different branches of the business logic may be utilized. A fulfillment rule 360, which may be an example of an invocable action, may identify a fulfillment center for fulfilling the order request. At 365, the process may output or generate a response based on the applied fulfillment rule 360. In some examples, the response includes an identification of a fulfillment center, generation of a fulfillment order, etc. The order may be automatically transmitted to the identified fulfillment center for order processing. When an order request is received at restful API 310, the requisite business logic may be identified based on the identification of an invocable action 375 (e.g., the action 350), the complex object may be generated and processed according the business logic, and the response generated based on the fulfillment rules corresponding to the invocable actions defined in the logic. The various components of the UI 345 may be used to request data from various data sources, update data of various data sources, determine branches (e.g., decisions) of the business logic, execute rules (e.g., fulfillment rules), or any combination of these.

At 335, the configured invocable actions 370 may be converted to the complex object type, such that the same contract (e.g., complex object) may be used in various implementations. Java implementation 340 may represent the same business logic (e.g., which may be configured according to the processing canvas 345) and the contract that may be invoked from either the restful APIs 310 or the invocable actions 370.

Figure 4:
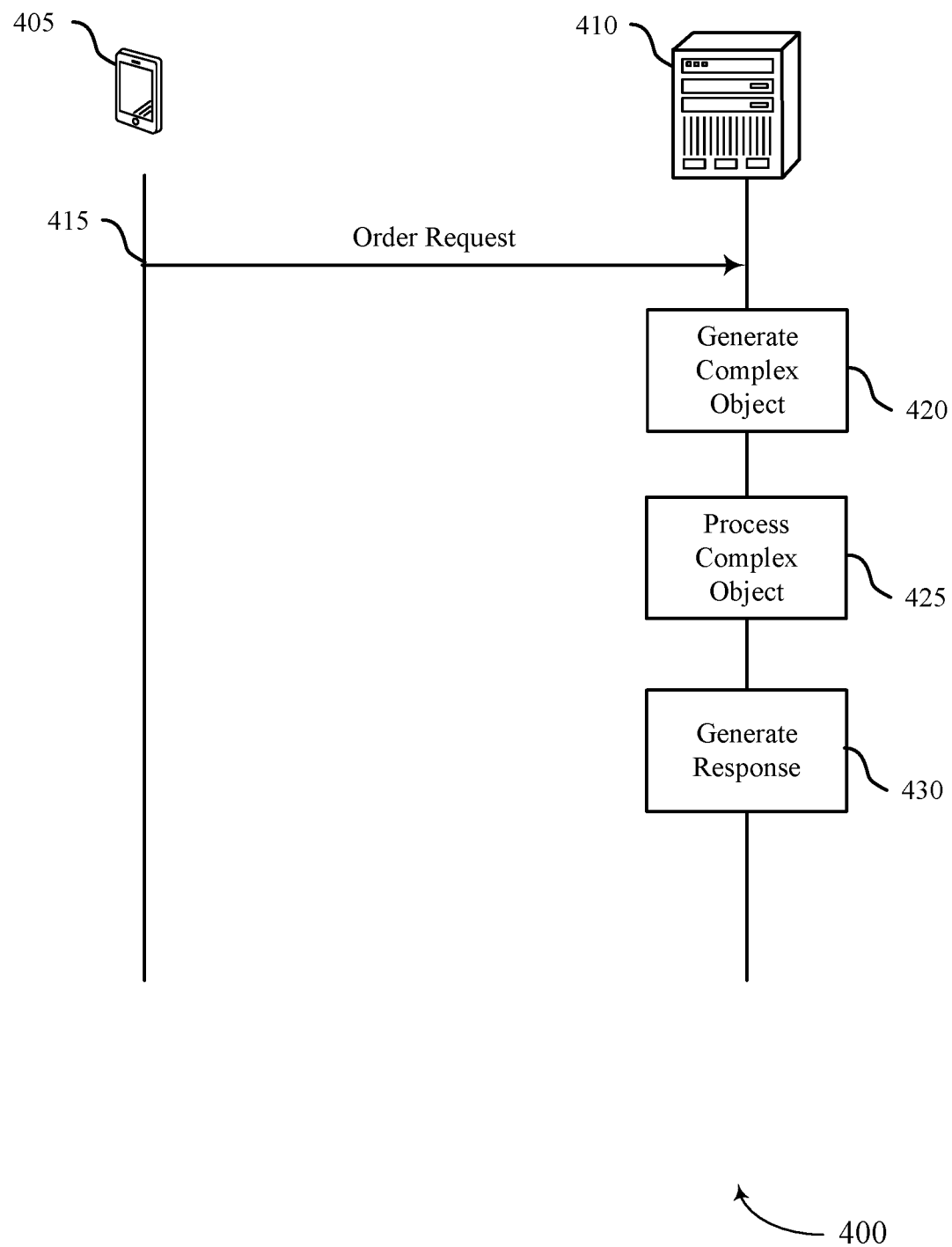
FIG. 4 illustrates an example of a process flow diagram that supports processing fulfillment using stateless APIs and complex classes in accordance with aspects of the present disclosure.

FIG. 4 illustrates an example of a process flow diagram 400 that supports processing fulfillment using stateless APIs and complex classes in accordance with aspects of the present disclosure. The process flow diagram 400 includes a client device 405 and a server 410, which may be examples of the corresponding devices described with respect to FIGS. 1 through 3. The server may support a fulfillment engine 255 and an object component 305, as described with FIGS. 2 and 3.

At 415, the server 410 may receive from the client device 405 and via a stateless web resource application programing interface (API), an order request. The order request may specify one or more order parameters and indicate an invocable action. For example, the client side application may be configured to identify an invocable action corresponding to a business logic process for fulfillment processing.

At 420, the server 410 may generate, according to the invocable action indicated by the order request, an instance of a complex object representing the order request. The complex object may include one or more nested data types corresponding to the one or more order parameters.

At 425, the server 410 may process the instance of the complex object according to one or more fulfillment rules specified in association with the invocable action. For example, a fulfillment rule may be defined in or indicated by a visual representation including a plurality of components added to a display template (e.g., the UI 345 of FIG. 3). The fulfillment rules may define processes for fulfilling the order request, such as by selecting a nearest fulfillment center, selecting a center that has enough product to fill the request, etc.

At 430, the server 410 may generate a response to the order request based at least in part on the processing of the instance of the complex object. In some cases, the response includes an identification of the fulfillment center, generation and transmission of a fulfillment order, etc.

FIG. 5 shows a block diagram 500 of an apparatus 505 that supports processing fulfillment using stateless APIs and complex classes in accordance with aspects of the present disclosure. The apparatus 505 may include an input module 510, an order response component 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the order response component 515 to support processing fulfillment using stateless APIs and complex classes. In some cases, the input module 510 may be a component of an input/output (I/O) controller 715 as described with reference to FIG. 7.

The order response component 515 may include an order interface 520, a complex object component 525, an object processing component 530, and a response component 535. The order response component 515 may be an example of aspects of the order response component 605 or 710 described with reference to FIGS. 6 and 7.

The order response component 515 and/or at least some of its various sub-components may be implemented in hardware, software executed by a processor, firmware, or any combination thereof. If implemented in software executed by a processor, the functions of the order response component 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The order response component 515 and/or at least some of its various sub-components may be physically located at various positions, including being distributed such that portions of functions are implemented at different physical locations by one or more physical devices. In some examples, the order response component 515 and/or at least some of its various sub-components may be a separate and distinct component in accordance with various aspects of the present disclosure. In other examples, the order response component 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The order interface 520 may receive, via a stateless web resource application programing interface (API), an order request, where the order request specifies one or more order parameters and indicates an invocable action.

The complex object component 525 may generate, according to the invocable action indicated by the order request, an instance of a complex object representing the order request, where the complex object includes one or more nested data types corresponding to the one or more order parameters.

The object processing component 530 may process the instance of the complex object according to one or more fulfillment rules specified in association with the invocable action.

The response component 535 may generate a response to the order request based on the processing of the instance of the complex object.

The output module 540 may manage output signals for the apparatus 505. For example, the output module 540 may receive signals from other components of the apparatus 505, such as the order response component 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

FIG. 6 shows a block diagram 600 of an order response component 605 that supports processing fulfillment using stateless APIs and complex classes in accordance with aspects of the present disclosure. The order response component 605 may be an example of aspects of an order response component 515 or an order response component 710 described herein. The order response component 605 may include an order interface 610, a complex object component 615, an object processing component 620, a response component 625, an object storage component 630, and a process user interface 635. Each of these modules may communicate, directly or indirectly, with one another (e.g., via one or more buses).

The order interface 610 may receive, via a stateless web resource application programing interface (API), an order request, where the order request specifies one or more order parameters and indicates an invocable action.

The complex object component 615 may generate, according to the invocable action indicated by the order request, an instance of a complex object representing the order request, where the complex object includes one or more nested data types corresponding to the one or more order parameters.

The object processing component 620 may process the instance of the complex object according to one or more fulfillment rules specified in association with the invocable action.

The response component 625 may generate a response to the order request based on the processing of the instance of the complex object.

In some examples, the response component 625 may identify at least one location for fulfilling the order request.

In some examples, the response component 625 may generate a fulfillment order corresponding to the order request and based on the one or more fulfillment rules.

In some cases, the at least one location includes a geographic location.

The object storage component 630 may store data corresponding to the order request in one or more variables defined by the complex object such as to be processable by the one or more fulfillment rules.

In some examples, the object storage component 630 may store the instance of the complex object as a file in a file storage system, where the one or more fulfillment rules are configured to process the file to generate the response.

The process user interface 635 may receive, at a user interface, a visual representation of the one or more fulfillment rules from a user, where the visual representation of includes a set of components added to a display template.

In some cases, each component of the set of components corresponds to a data request, a data update, a decision, a rule execution, or a combination thereof.

Figure 7:
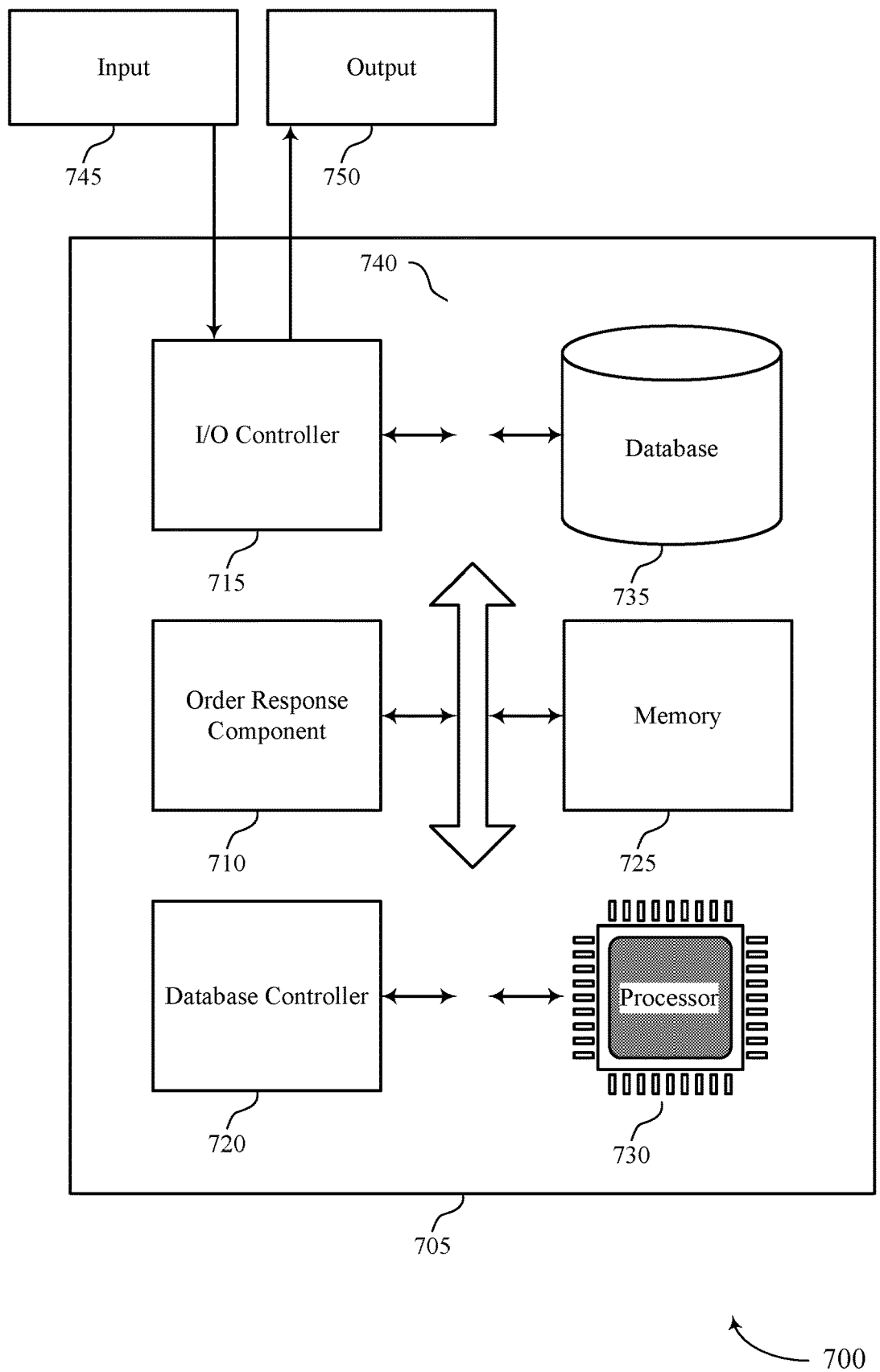
FIG. 7 shows a diagram of a system including a device that supports processing fulfillment using stateless APIs and complex classes in accordance with aspects of the present disclosure.

FIG. 7 shows a diagram of a system 700 including a device 705 that supports processing fulfillment using stateless APIs and complex classes in accordance with aspects of the present disclosure. The device 705 may be an example of or include the components of an operational data store or an apparatus 505 as described herein. The device 705 may include components for bi-directional data communications including components for transmitting and receiving communications, including an order response component 710, an I/O controller 715, a database controller 720, memory 725, a processor 730, and a database 735. These components may be in electronic communication via one or more buses (e.g., bus 740).

The order response component 710 may be an example of an order response component 515 or 605 as described herein. For example, the order response component 710 may perform any of the methods or processes described above with reference to FIGS. 5 and 6. In some cases, the order response component 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting processing fulfillment using stateless APIs and complex classes).

Figure 8:
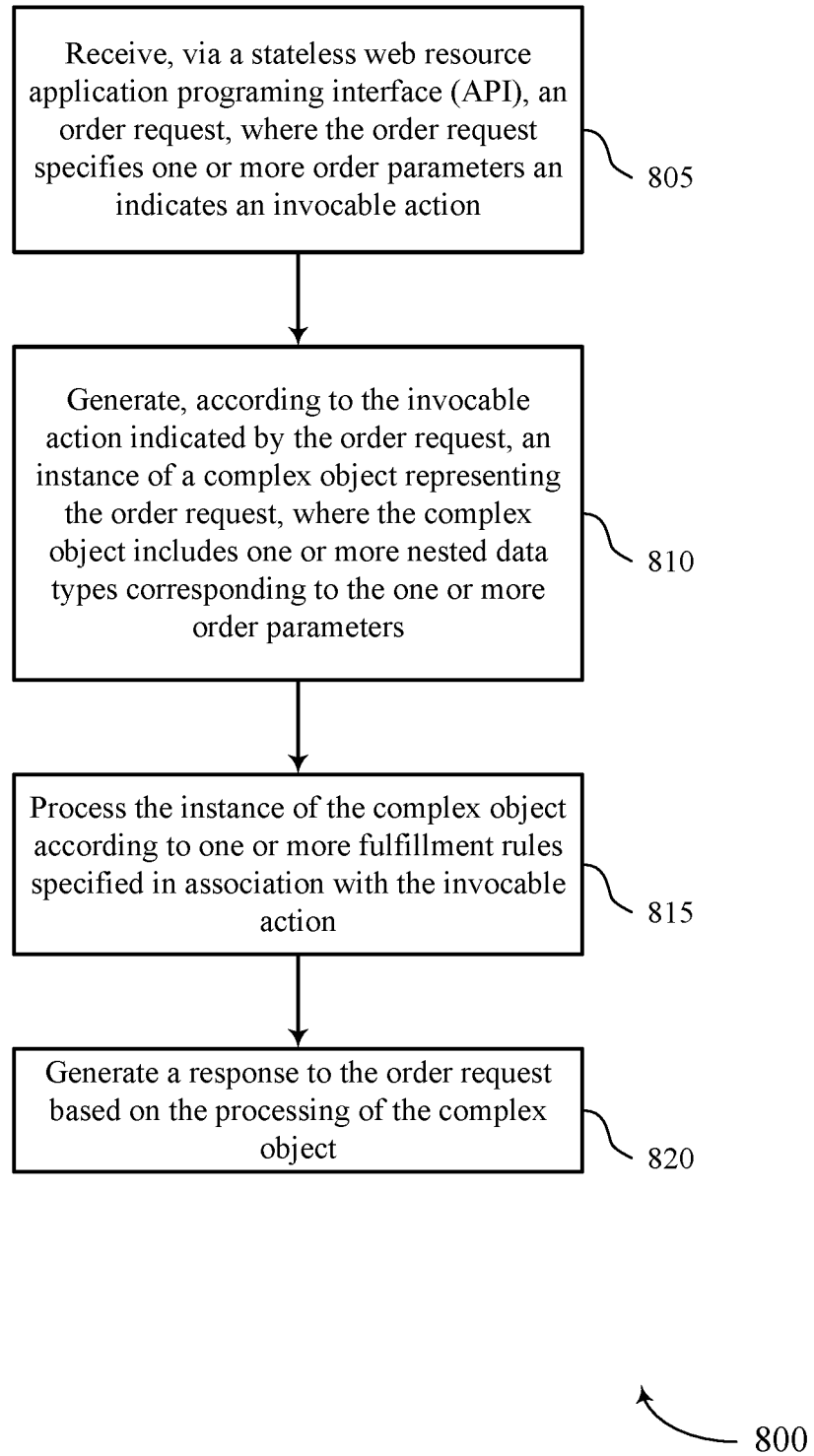
FIGS. 8 through 10 show flowcharts illustrating methods that support processing fulfillment using stateless APIs and complex classes in accordance with aspects of the present disclosure.

FIG. 8 shows a flowchart illustrating a method 800 that supports processing fulfillment using stateless APIs and complex classes in accordance with aspects of the present disclosure. The operations of method 800 may be implemented by an operational data store or its components as described herein. For example, the operations of method 800 may be performed by an order response component as described with reference to FIGS. 5 through 7. In some examples, an operational data store may execute a set of instructions to control the functional elements of the operational data store to perform the functions described below. Additionally or alternatively, an operational data store may perform aspects of the functions described below using special-purpose hardware.

At 805, the operational data store may receive, via a stateless web resource application programing interface (API), an order request, where the order request specifies one or more order parameters and indicates an invocable action. The operations of 805 may be performed according to the methods described herein. In some examples, aspects of the operations of 805 may be performed by an order interface as described with reference to FIGS. 5 through 7.

At 810, the operational data store may generate, according to the invocable action indicated by the order request, an instance of a complex object representing the order request, where the complex object includes one or more nested data types corresponding to the one or more order parameters. The operations of 810 may be performed according to the methods described herein. In some examples, aspects of the operations of 810 may be performed by a complex object component as described with reference to FIGS. 5 through 7.

At 815, the operational data store may process the instance of the complex object according to one or more fulfillment rules specified in association with the invocable action. The operations of 815 may be performed according to the methods described herein. In some examples, aspects of the operations of 815 may be performed by an object processing component as described with reference to FIGS. 5 through 7.

At 820, the operational data store may generate a response to the order request based on the processing of the instance of the complex object. The operations of 820 may be performed according to the methods described herein. In some examples, aspects of the operations of 820 may be performed by a response component as described with reference to FIGS. 5 through 7.

Figure 9:
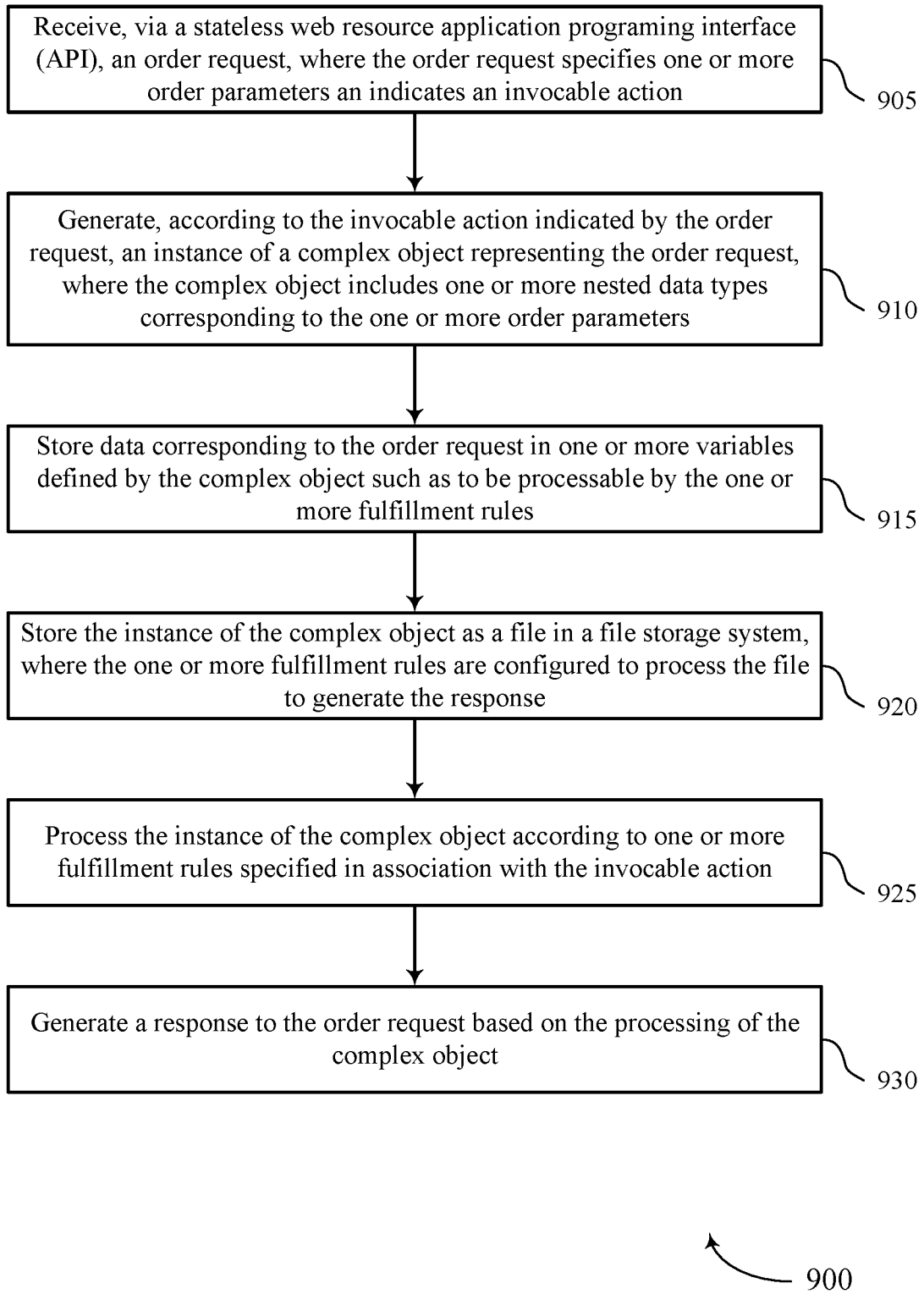

FIG. 9 shows a flowchart illustrating a method 900 that supports processing fulfillment using stateless APIs and complex classes in accordance with aspects of the present disclosure. The operations of method 900 may be implemented by an operational data store or its components as described herein. For example, the operations of method 900 may be performed by an order response component as described with reference to FIGS. 5 through 7. In some examples, an operational data store may execute a set of instructions to control the functional elements of the operational data store to perform the functions described below. Additionally or alternatively, an operational data store may perform aspects of the functions described below using special-purpose hardware.

At 905, the operational data store may receive, via a stateless web resource application programing interface (API), an order request, where the order request specifies one or more order parameters and indicates an invocable action. The operations of 905 may be performed according to the methods described herein. In some examples, aspects of the operations of 905 may be performed by an order interface as described with reference to FIGS. 5 through 7.

At 910, the operational data store may generate, according to the invocable action indicated by the order request, an instance of a complex object representing the order request, where the complex object includes one or more nested data types corresponding to the one or more order parameters. The operations of 910 may be performed according to the methods described herein. In some examples, aspects of the operations of 910 may be performed by a complex object component as described with reference to FIGS. 5 through 7.

At 915, the operational data store may store data corresponding to the order request in one or more variables defined by the complex object such as to be processable by the one or more fulfillment rules. The operations of 915 may be performed according to the methods described herein. In some examples, aspects of the operations of 915 may be performed by an object storage component as described with reference to FIGS. 5 through 7.

At 920, the operational data store may store the instance of the complex object as a file in a file storage system, where the one or more fulfillment rules are configured to process the file to generate the response. The operations of 920 may be performed according to the methods described herein. In some examples, aspects of the operations of 920 may be performed by an object storage component as described with reference to FIGS. 5 through 7.

At 925, the operational data store may process the instance of the complex object according to one or more fulfillment rules specified in association with the invocable action. The operations of 925 may be performed according to the methods described herein. In some examples, aspects of the operations of 925 may be performed by an object processing component as described with reference to FIGS. 5 through 7.

At 930, the operational data store may generate a response to the order request based on the processing of the instance of the complex object. The operations of 930 may be performed according to the methods described herein. In some examples, aspects of the operations of 930 may be performed by a response component as described with reference to FIGS. 5 through 7.

Figure 10:
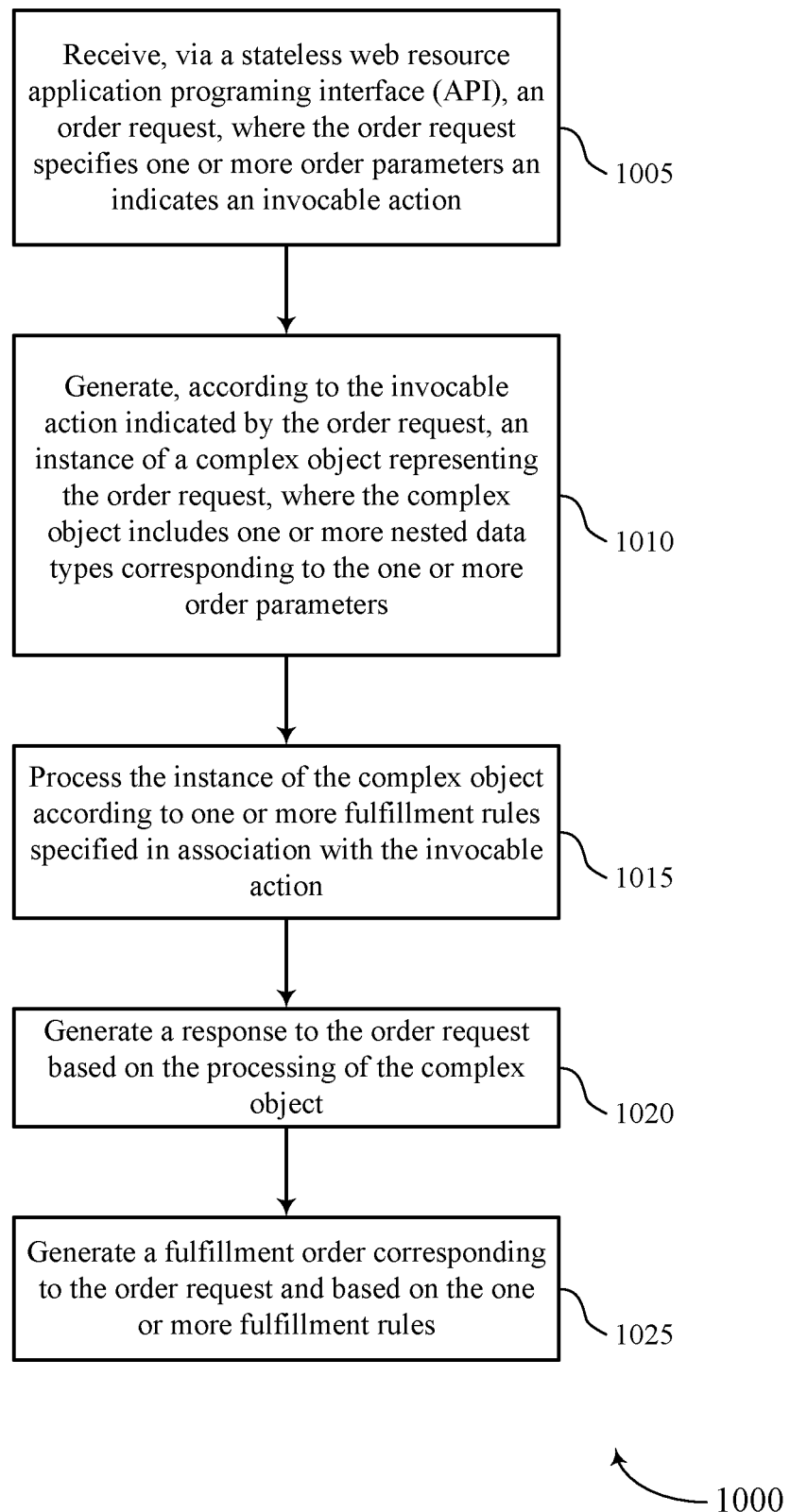

FIG. 10 shows a flowchart illustrating a method 1000 that supports processing fulfillment using stateless APIs and complex classes in accordance with aspects of the present disclosure. The operations of method 1000 may be implemented by an operational data store or its components as described herein. For example, the operations of method 1000 may be performed by an order response component as described with reference to FIGS. 5 through 7. In some examples, an operational data store may execute a set of instructions to control the functional elements of the operational data store to perform the functions described below. Additionally or alternatively, an operational data store may perform aspects of the functions described below using special-purpose hardware.

At 1005, the operational data store may receive, via a stateless web resource application programing interface (API), an order request, where the order request specifies one or more order parameters and indicates an invocable action. The operations of 1005 may be performed according to the methods described herein. In some examples, aspects of the operations of 1005 may be performed by an order interface as described with reference to FIGS. 5 through 7.

At 1010, the operational data store may generate, according to the invocable action indicated by the order request, an instance of a complex object representing the order request, where the complex object includes one or more nested data types corresponding to the one or more order parameters. The operations of 1010 may be performed according to the methods described herein. In some examples, aspects of the operations of 1010 may be performed by a complex object component as described with reference to FIGS. 5 through 7.

At 1015, the operational data store may process the instance of the complex object according to one or more fulfillment rules specified in association with the invocable action. The operations of 1015 may be performed according to the methods described herein. In some examples, aspects of the operations of 1015 may be performed by an object processing component as described with reference to FIGS. 5 through 7.

At 1020, the operational data store may generate a response to the order request based on the processing of the instance of the complex object. The operations of 1020 may be performed according to the methods described herein. In some examples, aspects of the operations of 1020 may be performed by a response component as described with reference to FIGS. 5 through 7.

At 1025, the operational data store may generate a fulfillment order corresponding to the order request and based on the one or more fulfillment rules. The operations of 1025 may be performed according to the methods described herein. In some examples, aspects of the operations of 1025 may be performed by a response component as described with reference to FIGS. 5 through 7.

A method of data processing is described. The method may include receiving, via a stateless web resource application programing interface (API), an order request, where the order request specifies one or more order parameters and indicates an invocable action, generating, according to the invocable action indicated by the order request, an instance of a complex object representing the order request, where the complex object includes one or more nested data types corresponding to the one or more order parameters, processing the instance of the complex object according to one or more fulfillment rules specified in association with the invocable action, and generating a response to the order request based on the processing of the instance of the complex object.

An apparatus for data processing is described. The apparatus may include a processor, memory coupled with the processor, and instructions stored in the memory. The instructions may be executable by the processor to cause the apparatus to receive, via a stateless web resource application programing interface (API), an order request, where the order request specifies one or more order parameters and indicates an invocable action, generate, according to the invocable action indicated by the order request, an instance of a complex object representing the order request, where the complex object includes one or more nested data types corresponding to the one or more order parameters, process the instance of the complex object according to one or more fulfillment rules specified in association with the invocable action, and generate a response to the order request based on the processing of the instance of the complex object.

Another apparatus for data processing is described. The apparatus may include means for receiving, via a stateless web resource application programing interface (API), an order request, where the order request specifies one or more order parameters and indicates an invocable action, generating, according to the invocable action indicated by the order request, an instance of a complex object representing the order request, where the complex object includes one or more nested data types corresponding to the one or more order parameters, processing the instance of the complex object according to one or more fulfillment rules specified in association with the invocable action, and generating a response to the order request based on the processing of the instance of the complex object.

A non-transitory computer-readable medium storing code for data processing is described. The code may include instructions executable by a processor to receive, via a stateless web resource application programing interface (API), an order request, where the order request specifies one or more order parameters and indicates an invocable action, generate, according to the invocable action indicated by the order request, an instance of a complex object representing the order request, where the complex object includes one or more nested data types corresponding to the one or more order parameters, process the instance of the complex object according to one or more fulfillment rules specified in association with the invocable action, and generate a response to the order request based on the processing of the instance of the complex object.

In some examples of the method, apparatuses, and non-transitory computer-readable medium described herein, generating the instance of the complex object may include operations, features, means, or instructions for storing data corresponding to the order request in one or more variables defined by the complex object such as to be processable by the one or more fulfillment rules.

Some examples of the method, apparatuses, and non-transitory computer-readable medium described herein may further include operations, features, means, or instructions for storing the instance of the complex object as a file in a file storage system, where the one or more fulfillment rules may be configured to process the file to generate the response.

In some examples of the method, apparatuses, and non-transitory computer-readable medium described herein, generating the response further may include operations, features, means, or instructions for identifying at least one location for fulfilling the order request.

In some examples of the method, apparatuses, and non-transitory computer-readable medium described herein, the at least one location includes a geographic location.

In some examples of the method, apparatuses, and non-transitory computer-readable medium described herein, generating the response further may include operations, features, means, or instructions for generating a fulfillment order corresponding to the order request and based on the one or more fulfillment rules.

Some examples of the method, apparatuses, and non-transitory computer-readable medium described herein may further include operations, features, means, or instructions for receiving, at a user interface, a visual representation of the one or more fulfillment rules from a user, where the visual representation of includes a set of components added to a display template.

In some examples of the method, apparatuses, and non-transitory computer-readable medium described herein, each component of the set of components corresponds to a data request, a data update, a decision, a rule execution, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, at a user interface, a configuration of a plurality of components corresponding to one or more fulfillment rules defining a fulfillment allocation process for an order request, wherein the one or more fulfillment rules are configured to identify at least one fulfillment center of a plurality of fulfillment centers;
receiving, via a stateless web resource application programing interface (API), the order request, wherein the order request specifies one or more order parameters and indicates an invocable action;
generating, according to the invocable action indicated by the order request, an instance of a complex object representing the order request, wherein the complex object includes one or more nested data types corresponding to the one or more order parameters and wherein the invocable action is configured to expose the one or more nested data types to the fulfillment allocation process defined by the one or more fulfillment rules;
storing, in accordance with the invocable action, the generated instance of the complex object representing the order request in an object storage system for processing to generate a response based on the one or more fulfillment rules;
processing, based at least in part on the invocable action exposing the one or more nested data types, the instance of the complex object stored in the object storage system according to the one or more fulfillment rules wherein the processing results in an identification of a fulfillment center of the plurality of fulfillment centers using the one or more order parameters included in the order request; and
generating a response to the order request based at least in part on the processing of the instance of the complex object, wherein the response includes at least an indication of the fulfillment center.

2. The method of claim 1, wherein generating the instance of the complex object comprises:
storing data corresponding to the order request in one or more variables defined by the complex object such as to be processable by the one or more fulfillment rules.

3. The method of claim 1, wherein generating the response further comprises:
identifying at least one location for fulfilling the order request.

4. The method of claim 3, wherein the at least one location comprises a geographic location.

5. The method of claim 1, wherein generating the response further comprises:
generating a fulfillment order corresponding to the order request and based on the one or more fulfillment rules.

6. The method of claim 1, further comprising:
receiving, at the user interface, a visual representation of the one or more fulfillment rules from a user, wherein the visual representation includes a plurality of components added to a display template.

7. The method of claim 6, wherein each component of the plurality of components corresponds to a data request, a data update, a decision, a rule execution, or a combination thereof.

8. An apparatus for data processing, comprising:
a processor,
memory coupled with the processor; and
instructions stored in the memory and executable by the processor to cause the apparatus to:
receive, at a user interface, a configuration of a plurality of components corresponding to one or more fulfillment rules defining a fulfillment allocation process for an order request, wherein the one or more fulfillment rules are configured to identify at least one fulfillment center of a plurality of fulfillment centers;
receive, via a stateless web resource application programing interface (API), the order request, wherein the order request specifies one or more order parameters and indicates an invocable action;
generate, according to the invocable action indicated by the order request, an instance of a complex object representing the order request, wherein the complex object includes one or more nested data types corresponding to the one or more order parameters and wherein the invocable action is configured to expose the one or more nested data types to the fulfillment allocation process defined by the one or more fulfillment rules;
store, in accordance with the invocable action, the generated instance of the complex object representing the order request in an object storage system for processing to generate a response based on the one or more fulfillment rules;
process, based at least in part on the invocable action exposing the one or more nested data types, the instance of the complex object stored in the object storage system according to the one or more fulfillment rules wherein the processing results in an identification of a fulfillment center of the plurality of fulfillment centers using the one or more order parameters included in the order request; and
generate the response to the order request based at least in part on the processing of the instance of the complex object, wherein the response includes at least an indication of the fulfillment center.

9. The apparatus of claim 8, wherein the instructions to generate the instance of the complex object are executable by the processor to cause the apparatus to:
store data corresponding to the order request in one or more variables defined by the complex object such as to be processable by the one or more fulfillment rules.

10. The apparatus of claim 8, wherein the instructions to generate the response further are executable by the processor to cause the apparatus to:
identify at least one location for fulfilling the order request.

11. The apparatus of claim 10, wherein the at least one location comprises a geographic location.

12. The apparatus of claim 8, wherein the instructions to generate the response further are executable by the processor to cause the apparatus to:
generate a fulfillment order corresponding to the order request and based on the one or more fulfillment rules.

13. A non-transitory computer-readable medium storing code for data processing, the code comprising instructions executable by a processor to:

receive, at a user interface, a configuration of a plurality of components corresponding to one or more fulfillment rules defining a fulfillment allocation process for an order request, wherein the one or more fulfillment rules are configured to identify at least one fulfillment center of a plurality of fulfillment centers;

receive, via a stateless web resource application programing interface (API), the order request, wherein the order request specifies one or more order parameters and indicates an invocable action;

generate, according to the invocable action indicated by the order request, an instance of a complex object representing the order request, wherein the complex object includes one or more nested data types corresponding to the one or more order parameters and wherein the invocable action is configured to expose the one or more nested data types to the fulfillment allocation process defined by the one or more fulfillment rules;

store, in accordance with the invocable action, the generated instance of the complex object representing the order request in an object storage system for processing to generate a response based on the one or more fulfillment rules;

process, based at least in part on the invocable action exposing the one or more nested data types, the instance of the complex object stored in the object storage system according to the one or more fulfillment rules wherein the processing results in an identification of a fulfillment center of the plurality of fulfillment centers using the one or more order parameters included in the order request; and generate the response to the order request based at least in part on the processing of the instance of the complex object, wherein the response includes at least an indication of the fulfillment center.

14. The non-transitory computer-readable medium of claim 13, wherein the instructions to generate the instance of the complex object are executable to:

store data corresponding to the order request in one or more variables defined by the complex object such as to be processable by the one or more fulfillment rules.

15. The non-transitory computer-readable medium of claim 13, wherein the instructions to generate the response further are executable to:

identify at least one location for fulfilling the order request.

16. The non-transitory computer-readable medium of claim 15, wherein the at least one location comprises a geographic location.

17. The non-transitory computer-readable medium of claim 13, wherein the instructions to generate the response further are executable to:

generate a fulfillment order corresponding to the order request and based on the one or more fulfillment rules.

* * * * *